United States Patent

[11] 3,593,044

[72] Inventors Joseph Hood McNeilly
Harlow, Essex;
Paul Barton, Bishop's Stortford,
Hertfordshire, both of, England

[21] Appl. No. 853,137
[22] Filed Aug. 26, 1969
[45] Patented July 13, 1971
[73] Assignee International Standard Electric Corporation
New York, N.Y.

[54] BIT SYNCHRONIZATION ARRANGEMENT FOR PCM SYSTEMS
10 Claims, 2 Drawing Figs.

[52] U.S. Cl. 307/269, 178/69.5, 179/15 BS, 307/208, 307/320, 328/63, 328/72, 328/155
[51] Int. Cl. H03k 5/00, H03k 17/26
[50] Field of Search 307/208, 269, 320; 328/63, 72, 155; 178/69.5; 179/15 BS

[56] References Cited
UNITED STATES PATENTS

| | | | |
|---|---|---|---|
| 3,271,688 | 9/1966 | Gschwind et al. | 328/155 X |
| 3,333,205 | 7/1967 | Featherston | 307/269 X |
| 3,440,548 | 4/1969 | Saltzberg | 328/155 X |

*Primary Examiner*—Stanley D. Miller, Jr.
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: The local bit clock is provided by an astable multivibrator having a varactor diode included in the cross coupling thereof to adjust the phase of the bit clock. A variable-width pulse is derived from the phase relation of a non-return-to-zero PCM signal and the local clock. A constant width pulse of one-bit clock period is derived from the PCM signal and inverted. These two pulse signals are algebraically combined and integrated to provide a control bias to adjust the bias of the varactor diode and, hence, clock phase to achieve and maintain bit synchronization.

Inventors
JOSEPH H. McNEILLY
PAUL BARTON
By Alfred C. Hill
Agent

Inventors
JOSEPH H. McNEILLY
PAUL BARTON
By Alfred C. Hill
Agent

BIT SYNCHRONIZATION ARRANGEMENT FOR PCM SYSTEMS

BACKGROUND OF THE INVENTION

This invention relates to PCM systems of communication and more particularly to an arrangement to provide bit synchronization in such systems.

The invention is particularly applicable to systems in which a nonreturn-to-zero, or 100 percent duty cycle modulation is utilized. In such systems the pulses denoting a 1 each occupy the full bit period, so that when a number of consecutive 1's are transmitted there is no transition in the signal, the only transitions occuring when a 1 is replaced by a 0 or visa versa. There is less timing information in a nonreturn-to-zero code than there is in say, a 50 percent duty cycle PCM transmission.

Not only is accurate bit synchronization required, in the sense that the decoder is running at the same bit rate as the coder, but also an optimum phase relationship between the decoder and the incoming PCM is desirable, since the most suitable time to examine the condition of the input signal is at the midpoint of each bit or digit position.

SUMMARY OF THE INVENTION

According to the present invention there is provided an arrangement for bit synchronization in the decoder of a PCM system of communication comprising a source of PCM signals; first means to produce local bit clock pulses; second means coupled to the source and the first means to produce variable-width pulses of given polarity, the width of said variable-width pulses being determined by the phase relationship between the PCM signal and the local clock pulses; third means coupled to the second means to produce constant-width pulses having a polarity opposite the given polarity, the width of the constant-width pulses being equal to a period of the local clock pulses; fourth means coupled to the second and third means to algebraically combine the variable-width and constant-width pulses and produce a control voltage; and fifth means coupled to the first and fourth means to apply the control voltage to the first means to adjust the phase of the local clock pulses to achieve and maintain bit synchronization.

Under optimum conditions the phase relationship between the clock and the PCM signals is such that each bit is read at the midpoint of the bit period. The fourth means for algebraically combining the variable-width and constant-width pulses includes means for inverting one of the pulses and means for integrating the inverted pulse with the other pulse and with a fixed bias voltage to generate the control voltage applied to the first means. The latter is preferably an astable multivibrator the period of which depends on the time constant of a cross-coupling connection between the two stages of the multivibrator including a varactor diode which is controlled by the control voltage.

BRIEF DESCRIPTION OF THE DRAWING

The above-mentioned and other features and objects of the invention will become more apparent by reference to the following description taken in conjunction with the accompanying drawings, in which.

DESCRIPTION OF THE PREFERRED EMBODIMENT

Figure 1:
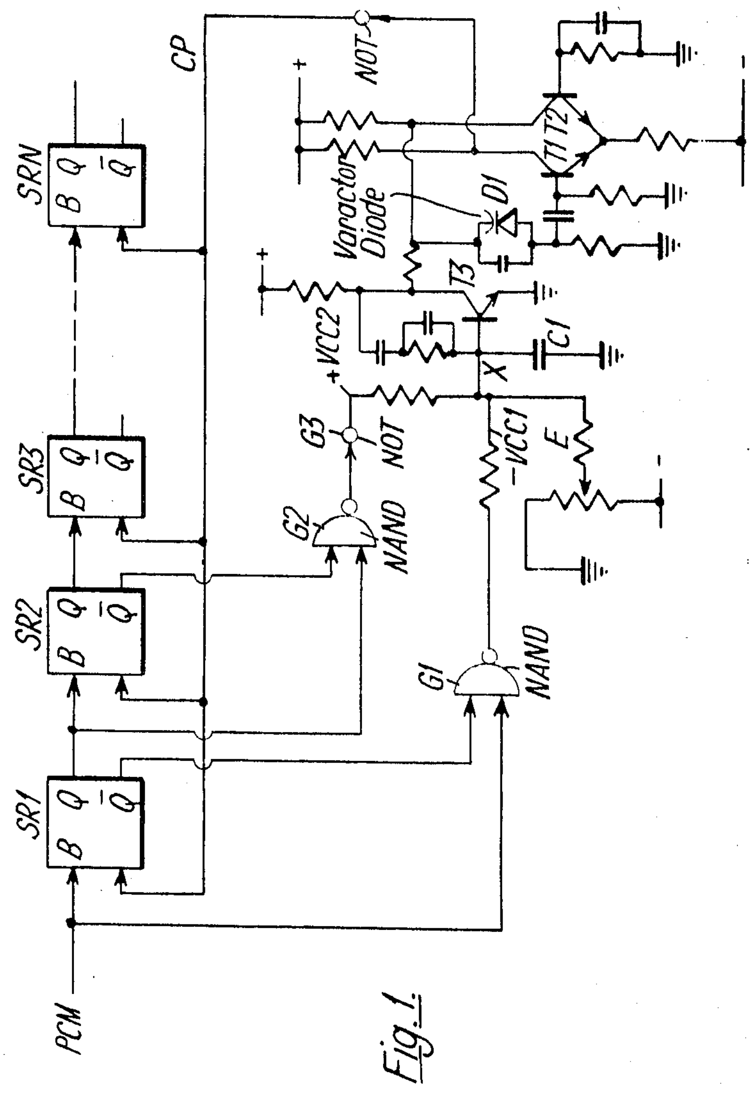
FIG. 1 illustrates a schematic circuit diagram, partially in block form, of an arrangement for achieving bit synchronization in a nonreturn-to-zero PCM system in accordance with the principles of this invention.

In the arrangement shown in FIG. 1 the incoming PCM signals are fed into a shift register having stages SR1, SR2, SR3...SRN. The incoming PCN digits B are stepped along the shift register stages under the control of the locally generated stream of clock pulses CP. Each stage of the shift register gives two outputs Q and $\bar{Q}$, the digit condition and the inverse of the digit condition, respectively.

The clock pulses CP are generated by an astable multivibrator provided by two transistors T1, T2. The period of the multivibrator depends on the time constant of the coupling circuit between the collector of T2 and the base of T1, and this coupling circuit includes a variable capacitance (varactor) diode D1 so that by varying the reverse bias on diode D1 the clock period can be altered.

Figure 2:
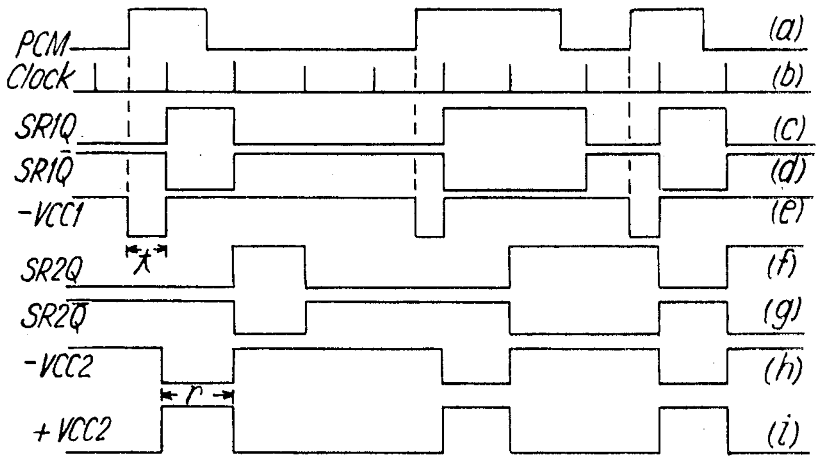
FIG. 2 illustrates certain of the waveforms appearing at different points in the circuit of FIG. 1.

Consider now an incoming PCM signal with 100 percent duty cycle (nonreturn-to-zero) as shown in FIG. 2(*a*). The locally generated clock pulses CP are shown in FIG. 2(*b*). It is assumed that the phase relationship between the clock and the incoming PCM is arbitrary. Therefore, if the first stage SR1 is sampled an output as shown at FIG. 2(*c*) will appear. This output, SR1Q, is the same as the PCM input, but it will be delayed by an amount dependent on the phase relationship between the clock and the input. If now output SR1$\bar{Q}$, (FIG. 2(*d*)) which has the same phase as SR1Q, is gated with the PCM input via NAND-gate G1 the result will be a series of negative going pulses −VCC1 of variable width $t$, which is determined by the amount of delay in SR1$\bar{Q}$.

The value of $t$ must be adjusted until the optimum phase relationship between clock and input is achieved. To do this a second series of pulses −VCC2 is derived by gating together outputs SR1Q and SR2$\bar{Q}$. Since the input to SR2 is SR1Q, and since this is entirely under the control of the clock, as are the outputs SR2Q and SR2$\bar{Q}$ (FIG. 2(*f*) and (*g*)), the output from NAND-gate G2 must be a series of pulses −VCC1 (FIG. 2(*h*)) of constant width $\tau$ which is the period of the clock. These pulses are inverted in NOT-gate G3 to give the positive-going pulses +VCC2 which are equal in number to the negative-going pulses−VCC1. If now these two sets of pulses are algebraically combined and integrated, a bias or control voltage to control the period of the astable multivibrator can be derived. −VCC1 and +VCC2 are combined with a constant bias voltage $E$ and integrated by capacitor $C1$. so that the voltage at point $X$ is given by:

$$V_X=K_1VCC1\left(1-\frac{t}{T}\right)+K_2VCC2\left(\frac{\tau}{T}\right)+K_3E,$$

where $K_1$, $K_2$ and $K_3$ are mixing constants and $T$ is the average period of the pulses. Hence, $$V_X=\frac{VCC1}{T}(K_2\tau-K_1t)+K_1VCC2+K_3E$$

The unwanted DC component is removed by making $K_1$ $VCC2$ $+K_3$ $E=V_{BE}$, where $V_{BE}$ is the forward voltage drop between base and emitter of transistor T3.

$V_X$ is then applied via transistor T3 to control the reverse bias on diode D1 and so control the time constant of the multivibrator cross-coupling circuit.

The circuit is arranged to stabilize when $K_2=K_1\,t$, in which condition $V_X=V_{BE}$, independent of $T$. Therefore, by making $K_1$ $=2\,K_2$ and $t=\frac{1}{2}\tau$ the circuit is stabilized with the desired phase relationship between the clock pulses CP and the input PCM signal, namely, clock pulses CP occur at the midpoint of a bit period of the PCM signal.

The voltage $V_X$ is applied to the base of transistor T3 and the output signal developed at the collector of T3 is used as the reverse bias for the varactor diode D1.

Suppose the clock period tends to increase. The negative pulse of width $t$ becomes wider and so $V_X$ falls. The varactor diode reverse bias increases, thus, decreasing the clock period and bringing the clock back into synchronization and correct phase. Frequent transitions in the incoming PCM will result in a right control of the clock. Adequate stabilization for infrequent transitions requires a high gain in the amplifying stage T3. The arrangement shown can maintain synchronization and near optimum phase relationship for transitions occurring at a rate of approximately one in every 100 bits. This is equivalent to a severe speech overload when the frequency is as low as 300 Hz.

While we have described above the principles of our invention in connection with specific apparatus, it is to be clearly understood that this description is made only by way of example.

We claim:

1. A bit synchronization arrangement for a PCM system comprising:
a source of PCM signal;
first means to produce local bit clock pulses;
second means coupled to said source and said first means to produce variable-width pulses of given polarity, the width of said variable-width pulses being determined by the phase relationship between said PCM signal and said local clock pulses;
third means coupled to said second means to produce constant-width pulses having a polarity opposite said given polarity, the width of said constant-width pulses being equal to a period of said local clock pulses;
fourth means coupled to said second and third means to algebraically combine said variable-width and constant-width pulses and produce a control voltage; and
fifth means coupled to said first and fourth means to apply said control voltage to said first means to adjust the phase of said local clock pulses to achieve and maintain bit synchronization.

2. An arrangement according to claim 1, wherein
said first means includes
an astable multivibrator having a cross-coupling circuit between the stages thereof including a varactor diode responsive to said control voltage to adjust the phase of said local clock pulses.

3. An arrangement according to claim 1, wherein
said second means includes
a shift register coupled to said source and said first means, said PCM signal being shifted into said shaft register under control of said local clock pulses, and
first gate means coupled to said source and an output from the first stage of said shift register to produce said variable-width pulses.

4. An arrangement according to claim 3, wherein
said third means includes
second gate means coupled to an output from the first stage of said shift register and an output from the second stage of said shift register to produce said constant-width pulses.

5. An arrangement according to claim 1, wherein
said fourth means includes
a capacitor coupled to said second and third means to produce said control voltage.

6. An arrangement according to claim 5, further including a constant voltage source coupled to said capacitor.

7. An arrangement according to claim 1, wherein
said fifth means includes
an amplifier coupled to said fourth means to apply said control voltage to said first means.

8. An arrangement according to claim 1, wherein
said first means includes
an astable multivibrator having a cross-coupling circuit between the stages thereof including a varactor diode responsive to said control voltage to adjust the phase of said local clock pulses;
said second means includes
a shift register coupled to said source and said first means, said PCM signal being shifted into said shift register under control of said local clock pulses, and
first gate means coupled to said source and an output from the first stage of said shift register to produce said variable-width pulses;
said third means includes
second gate means coupled to an output from the first stage of said shift register and an output from the second stage of said shift register to produce said constant-width pulses;
a constant voltage source;
said fourth means includes
a capacitor coupled to said first and second gate means and said constant voltage source to produce said control voltage; and
said fifth means includes
an amplifier coupled to said capacitor to apply said control voltage to said varactor diode.

9. An arrangement according to claim 8, wherein
said first gate means is coupled to the inverting output of the first stage of said shift register; and
said second gate means is coupled to the normal output of the first stage of said shift register and the inverting output of the second stage of said shift register.

10. An arrangement according to claim 9, wherein
said first gating means includes
a first NAND gate coupled to said source and the inverting output of the first stage of said shift register; and
said second gating includes
a second NAND gate coupled to the normal output of the first stage of said shift register and the inverting output of the second stage of said shift register, and
a NOT gate coupled to the output of said second NAND gate.